(12) United States Patent
Meier et al.

(10) Patent No.: US 8,680,178 B2
(45) Date of Patent: Mar. 25, 2014

(54) PROCESS FOR PREPARING A THERMALLY REACTIVE PRESSURE-SENSITIVE ADHESIVE

(75) Inventors: Andreas Meier, Hamburg (DE); Matthias Seibert, Hamburg (DE); Sabine Thormeier, Hamburg (DE); Karsten Seitz, Buxtehude (DE)

(73) Assignee: Tesa SE, Hamburg (DE)

( * ) Notice: Subject to any disclaimer, the term of this patent is extended or adjusted under 35 U.S.C. 154(b) by 375 days.

(21) Appl. No.: 12/643,703

(22) Filed: Dec. 21, 2009

(65) Prior Publication Data

US 2010/0160569 A1 Jun. 24, 2010

(30) Foreign Application Priority Data

Dec. 23, 2008 (DE) .......................... 10 2008 063 036

(51) Int. Cl.
*C08J 3/00* (2006.01)
*B05D 5/10* (2006.01)

(52) U.S. Cl.
USPC .......................... 523/353; 427/208.4; 427/294

(58) Field of Classification Search
USPC ........ 427/208.4, 294, 428, 496, 551; 523/353
See application file for complete search history.

(56) References Cited

U.S. PATENT DOCUMENTS

| | | | | |
|---|---|---|---|---|
| 5,849,133 A | * | 12/1998 | Senderling et al. | 156/315 |
| 6,506,447 B1 | * | 1/2003 | Hirsch et al. | 427/208.4 |
| 2009/0221744 A1 | * | 9/2009 | Thormeier et al. | 524/575.5 |

FOREIGN PATENT DOCUMENTS

| | | |
|---|---|---|
| EP | 1056584 A1 | 12/2000 |
| EP | 1077244 A2 | 2/2001 |
| EP | 1078968 A1 | 2/2001 |

OTHER PUBLICATIONS

"Activator." Dictionary.com. Retrieved online [11-11-18], 2011.*
German Search Report, Dated Sep. 4, 2009.

* cited by examiner

*Primary Examiner* — Hannah Pak
(74) *Attorney, Agent, or Firm* — Norris McLaughlin & Marcus PA

(57) ABSTRACT

The in-line repair operations in the automotive industry require high-temperature masking tapes which satisfy a particular profile of requirements. Hence such masking tapes must be temperature-stable and must have a high crosslinking potential. Masking tapes employed are tapes coated with thermally crosslinking natural rubber (NR) adhesives which have a crosslinker resin/phenolic resin component.

Thermally reactive pressure-sensitive adhesives of this kind are prepared by a process comprising a non-thermoplastic rubber constituent of the pressure-sensitive adhesive and a crosslinker system, the crosslinker system comprising a promoter component and as crosslinking component a reactive phenolic resin, where, in the process, the rubber constituent and a first component of the crosslinker system are mixed homogeneously in a mixing assembly, at a first processing temperature of the mixing assembly, to give a premix, a premix temperature being established in the premix; subsequently the premix is cooled from the premix temperature to a final composition temperature which is lower than the first premix temperature; and lastly the second component of the crosslinker system is added to the premix.

8 Claims, 2 Drawing Sheets

PROCESS FOR PREPARING A THERMALLY REACTIVE PRESSURE-SENSITIVE ADHESIVE

The invention relates to a process for preparing a thermally reactive pressure-sensitive adhesive, comprising a non-thermoplastic rubber constituent of the pressure-sensitive adhesive, and a crosslinker system, the crosslinker system comprising a promoter component and as crosslinking component a reactive phenolic resin, and also to a thermally reactive pressure-sensitive adhesive prepared by such a process.

The importance of pressure-sensitive adhesives (PSAs) has increased greatly in recent years. PSAs are adhesives which, even under a relatively gentle application pressure, permit durable bonding with the bond substrate and, after use, can be detached again from the substrate substantially without residue.

As PSAs here it is possible to use adhesives which possess thermoplastic properties. Besides these there are also non-thermoplastic PSAs. The latter are typically mixtures of at least one polymer which is dimensionally stable and elastically deformable at room temperature (a so-called elastomer) with further constituents which are added in order to influence the properties of the overall mixture (the so-called compound) in a desired way. PSAs of this kind are typically prepared by mixing the individual components with one another in the course of what is known as compounding. Simultaneously with or subsequent to this blending, the preparation of the PSAs may necessitate additional chemical reactions, such as an aftercrosslinking of the applied adhesive for the purpose of raising the viscosity.

Adhesives have a broad field of application in the form of adhesive tapes as well. In car manufacture, for instance, adhesive tapes are used at many points. One area is that of what is called the in-line repair process. In this process, paint damage found in the initial coating of vehicle parts is repaired immediately following the first coating operation. This is done by means of a further coating system, which is dried and baked at around 130 to 160° C. for around 20 to 40 minutes. Masking tapes employed in this process are required to withstand such temperature loads. Masking tapes which meet this criterion are the so-called HT (high-temperature) paper masking tapes. They are coated with thermally crosslinking natural rubber (NR) adhesives which have a crosslinker resin/phenolic resin component.

Generally speaking, the adhesive is crosslinked by electron beam curing (EBC). EBC crosslinking guarantees the adhesive tape in application a temperature stability of up to around 130° C., meaning in particular that the adhesive tape can be removed without residue following temperature exposure. The crosslinking of the phenolic resins begins generally at temperatures >130° C. and counteracts the oxidative degradation of the rubber molecules; in other words, following temperature exposure, the relatively short rubber molecules remain bound within the network of phenolic resins and rubber molecules, a fact which allows the adhesive tape to be removed without residue.

The crosslinking reaction may, however, also be adapted to the process conditions during use of the adhesive tape. In the case of use as masking tapes on the coating lines in the in-line repair process, it is desirable for crosslinking to take place as part of the drying/baking operation. For this to be so, the crosslinking reaction must proceed at a measurably rapid rate above 130° C. and as far as possible completely within the drying cycle, i.e. within around 30 minutes.

Where the crosslinking reaction is to take place only when the adhesive tape is being used, it is necessary to ensure that during preparation there is no premature crosslinking of the adhesives used, and that the adhesive still possesses a high crosslinking potential.

To date (cf. e.g. EP 1056584) preparation has taken place via solventless mixing of the individual constituents of the adhesive—that is, of the rubber, of the crosslinker resin and, where used, of further additives such as crosslinking catalysts. Owing to the viscosity of the substances employed, this necessitates selection of a suitable mixing assembly. The constituents of the adhesive are supplied to the mixing assembly generally in liquid form or in solid form, in the latter case preferably as individual pieces such as granules or pellets, for example.

The mixing of the individual constituents therefore necessitates the use of mixing assemblies which permit intense comixing in conjunction with a high mixing performance. Particularly in view of the high viscosity of the non-thermoplastic constituents, it is common to have recourse, for this purpose, to internal mixers or extruders, such as to twin-screw extruders or planetary roller extruders, in order to be able to apply the high shearing energies that are necessary for the homogeneous comixing of the adhesive.

The introduction of the high shearing energies into the high-viscosity mixture results in the temperature of the mixture rising to levels which are well above the temperature at which the chemical crosslinking reaction of the phenolic resins unfolds at a measurably rapid rate, this being accompanied by unwanted premature crosslinking of the adhesive.

The general preparation process for adhesives by means of extruder technology is described in EP 1056584. Claims 16 and 17 specify that, in this extruder compounding process, it is also possible to process crosslinker resins and phenolic resins. EP 1077244 describes the constitution of the thermally crosslinkable compositions which can be produced and applied by means of the compounding process.

In accordance with the prior art, all of the components (raw materials) of the thermally crosslinkable composition are introduced together into the intake region of the extruder line, the components are thoroughly mixed and homogenized, and the composition, finally, is applied to the carrier material by a calendering process.

A disadvantage of the process described in the cited patents for the preparation of the thermally crosslinking compositions is that it functions reliably only when the temperatures in the extruder line are below the crosslinking temperatures of the adhesives. Yet it is exactly during the breaking-down of the rubber—in the compounding region of the extruder line—that the temperatures may be significantly higher and in some cases may be up to 180° C. The actual values to which the temperatures rise in the compounding region are dependent essentially on the formula of the composition, on the performance of the cooling assemblies, on the surface/volume ratio of the compounding compartment, and on the heat transfer. Experience has shown that in large extruders in particular, with which high throughputs (>500 kg/h) can be obtained, the less favourable surface/volume ratio causes the temperatures in the compounding region to climb to levels of above 130° C. In this case there may be crosslinking of the rubber composition, with the following consequences:

gel specks in the composition cause the subsequent coat (the adhesive tape following application of the adhesive) to have defects, such as an inhomogeneous coating pattern, or streaks with no composition, for example;

the process, because of temporal (during passage through the extruder line and coating line) and local (over the width of the coating) fluctuations in viscosities of the composition, on account of volume elements of the composition that are crosslinked to different degrees, is unstable; there may be pulsating flows of composition as a result of more highly crosslinked compositions in dead spaces. The consequences may be substantial fluctuations in the weight of composition applied (coating) or in the degree of crosslinking (bond strength) along a production batch, leading to variations in quality;

as a result of unwanted premature crosslinking, the desired crosslinking potential in the application is no longer available (the prematurely crosslinked composition is degraded again in the extruder), with the consequence of variations in quality in respect of the residues of composition; and when the line is halted, the rubber composition crosslinks completely in the regions with temperatures >130° C., and the start up of the line is greatly jeopardized as a result of the high composition viscosities. In this case the extruder line must be cleaned, which is complex and time-consuming.

It was an object of the invention, therefore, to provide a process of the type specified at the outset that allows the preparation of a thermally reactive pressure-sensitive adhesive which still has a high crosslinking potential following preparation.

This object is achieved in accordance with the invention in that, in a process of the type specified at the outset, the rubber constituent and a first component of the crosslinker system are mixed homogeneously in a mixing assembly, at a first processing temperature of the mixing assembly, to give a premix, a premix temperature being established in the premix;

subsequently the premix is cooled from the premix temperature to a final composition temperature which is lower than the first premix temperature; and lastly the second component of the crosslinker system is added to the premix.

Accordingly there is a local separation between the addition of the reactive component (comprising the first component of the crosslinker system, i.e. crosslinker resin or promoter component) and of the non-reactive base composition (comprising rubber and second component of the crosslinker system, and also, where used, tackifier resins, fillers, plasticizers, other auxiliaries).

The reactive components are mixed with the base composition only when the base composition is homogeneous, i.e. the rubber is broken down and the temperature of the composition is below the temperature at which the thermally reactive components react, i.e. the crosslinking reaction unfolds at a clearly measurable rate. In this way it is possible with simplicity to obtain an adhesive having a high crosslinking potential. The addition of process aids such as water, for example, to lower the temperature of the process composition and/or to keep the temperature at a particular level is unnecessary.

The process is suitable in particular for a continuous process regime.

For a reliable manufacturing operation with deferred addition of the reactive components there are in principle three possible routes.

1) Addition of the components of the base composition and of the promoter component into the intake region of the extruder line, and deferred addition of the crosslinker resin.
2) Addition of the components of the base composition into the intake region of the extruder line and deferred addition of the crosslinker resin and of the promoter component.
3) Addition of the components of the base composition and of the crosslinker resin into the intake region of the extruder line, and deferred addition of the promoter component.

Route 1) is preferred, since the common crosslinkers, based on phenolic resins, lose their crosslinking potential on heating to temperatures above softening or melting temperature. The higher the temperature, the more rapidly this occurs. Moreover, even without catalyst, the crosslinkers react with the rubber molecules, albeit considerably more slowly, but in an uncontrolled way. In both cases the coated adhesive tapes in application would have a lower crosslinking potential, which is unwanted.

Advantageously, when the second component of crosslinker system is added, the premix is being mixed in a mixing assembly, since in this way it is ensured that mixing takes place during the actual addition and hence a homogeneous product is obtained. It is particularly preferred here if the mixing of the premix with the second component of the crosslinker system is carried out in the same mixing assembly as the mixing of the non-thermoplastic rubber constituent of the pressure-sensitive adhesive with the first component of the crosslinker system, since this obviates transfer from one vessel to another and minimizes product losses.

A particularly suitable mixing assembly, especially for the addition of the second component of the crosslinker system to the premix, is a planetary roller extruder. As a result of the intense comixing within the planetary roller extruder, there is a low residence time in conjunction with a narrow residence-time spectrum and a frequent surface renewal, which results in rapid exchange of material and heat exchange, by means of which the energy introduced into the polymer via internal friction events can be removed rapidly and effectively. This opens up the possibility for particularly gentle and temperature-controlled operation.

The preparation of the adhesive may be followed by a coating process in which the adhesive can be applied to a carrier so as to produce, for example, an adhesive tape. This may take place by means, for example, of a downstream extrusion die. A further possibility for coating lies in the use of a multi-roll applicator or multi-roll calender.

The constituents of the adhesive are preferably introduced solventlessly into the process. This avoids additional process steps such as, for instance, the dissolving of the polymers in the solvent or the stripping of the solvent from the end product.

The rubber constituent is selected from the group encompassing natural rubbers and synthetic rubbers. It is favourable here if the base component of the pressure-sensitive adhesive is a non-thermoplastic elastomer selected from the group encompassing natural rubbers and synthetic rubbers, or is a mixture (referred to as a blend) of natural rubbers and/or synthetic rubbers. The process of the invention is outstandingly suitable for the gentle preparation of rubber-based PSAs of this kind, since with these systems a disruptive degradation is effectively prevented to a particular degree.

As natural rubber it is possible in principle to employ all suitable natural rubbers; this encompasses, for instance, natural rubbers in all available quality grades, for example crepe, RSS, ADS, TSR or CV types, which can be selected in accordance with the required purity and the requisite viscosity.

As a synthetic rubber it is possible in principle to use all suitable synthetic rubbers, examples being randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), polyurethanes, silicone rubbers and/or mixtures of these, without wishing unnecessarily to restrict the selection through the enumeration of possible examples.

It is particularly advantageous to use a natural rubber as the rubber constituent of the PSA, since natural rubber, as a raw material combining cost-effectiveness with good adhesion properties, ensures a high-value product at market-compatible prices. In the case of the present invention, processing takes place preferably under nitrogen, since in general no breakdown of the rubber is desired. If rubber breakdown (mastication) should be desired, then oxygen is blown in deliberately and the operating conditions are selected accordingly.

The thermal crosslinking is catalysed in general by Lewis acids such as $ZnCl_2$, Zn octoate, zinc stearate, etc., as a promoter. Optionally it is also possible to add a second promoter component which, together with the promoter component, forms the promoter system and catalyses the crosslinking by the crosslinking component. The second promoter component can be added either together with the first component of the crosslinker system or else together with the second component of the crosslinker system.

Promoter systems contemplated that are composed of two promoter components include, for example, ZnO or MgO in conjunction with an organic acid, resin acid in particular.

A particularly preferred promoter component of the crosslinker system for a one-component system is zinc resinate, and a particularly preferred promoter component as a promoter system comprising two promoter components is a combination of ZnO and resin acid.

For the above-described three possible routes in principle for a reliable manufacturing operation with deferred addition of the reactive components there are further variants in the case of the promoter system comprising two promoter components, since either the second promoter component may in each case be added in the intake region or else its addition may be deferred. For a two-component promoter system it is particularly preferred if base composition and (first) promoter component are added in the intake region of the extruder line and the addition of crosslinker resin and of second promoter component is deferred.

In order to ensure a sufficiently gentle process regime it is preferred if the premix temperature is at least 140° C. and at most 200° C.

For the final composition temperature it is particularly advantageous if it is at least 90° C. and at most 140° C., preferably at least 110° C. and at most 130° C. Since the crosslinking of the rubber constituent occurs at a measurable rate from about 130° C. onwards, a temperature below this figure is desirable.

The invention further provides a thermally reactive pressure-sensitive adhesive having a high crosslinking potential, comprising a non-thermoplastic rubber constituent and a crosslinker system comprising a crosslinking component and a promoter component, which is preparable by the processes described above. A thermally reactive PSA of this kind can be employed in many areas and is particularly suitable when crosslinking is desired only at a later point in time, i.e. after the preparation of the adhesive. It is especially suitable for the production of adhesive tapes. The noncrosslinked adhesive can be applied to the adhesive tape. During the preparation of the adhesive and its application to the adhesive tape, the adhesive remains noncrosslinked, i.e. it retains its crosslinking potential, and there is no increase in cohesion. Crosslinking may be brought about at a later point in time, as for example during the adhesive tape application. This is desired in the case, for example, of the paper masking tapes described at the outset, for which the adhesive of the present invention is especially suitable. In order to allow controlled crosslinking at a later point in time, it is necessary for the adhesive tape to have a sufficient thermal stability.

Critical for the thermal stability of the adhesive tape in a temperature application is the crosslinking potential, which is defined here as the difference between final value (t>20 min) and initial value (t=0) of the viscosity (measured in a viscometer at 10 rad/s and a temperature of T=180° C.). For sufficient temperature stability (i.e. residueless removal of the adhesive tape after 1 hour under a temperature load of 140° C.) it is desirable for the crosslinking potential to be greater than 2000 Pas, in order to prevent the formation of residues, a phenomenon which can occur if the figures are lower. From the standpoint of application, there is in principle no upper limit on the crosslinking potential. In actual fact, at high crosslinking potentials of more than 30 000 Pas (measured at 10 rad/s and a temperature of T=180° C.), the conditions of the manufacturing operation become unstable. Temperature fluctuations to high temperatures lead to crosslinking of the thermally reactive compositions even in the case of short process standstill times. A crosslinking potential in the range from 2000 to 30 000 Pas is therefore particularly preferred.

The crosslinking potential is heavily dependent on the concentration of crosslinker resin and on the rubber/resin ratio. The higher the crosslinker resin fraction and/or the rubber fraction, the faster the crosslinking kinetics and the higher the crosslinking potential. Particularly suitable adhesives with application-relevant crosslinking potentials of between 2000 and 30 000 Pas can be obtained if the fraction of the crosslinking component is from 2% to 10% by weight, preferably from 3% to 6% by weight, with particularly good results being obtained with a fraction of 4.5% by weight. A ratio of rubber constituent to crosslinking component of from 1.0 to 2.0, more particularly 1.2 to 1.6, has emerged as being particularly advantageous.

Further advantages and application opportunities are apparent from the exemplary embodiment below, which is described in more detail by reference to the attached drawing. In the drawings FIG. 1 shows schematically the preparation process of the invention;

Figure 1:
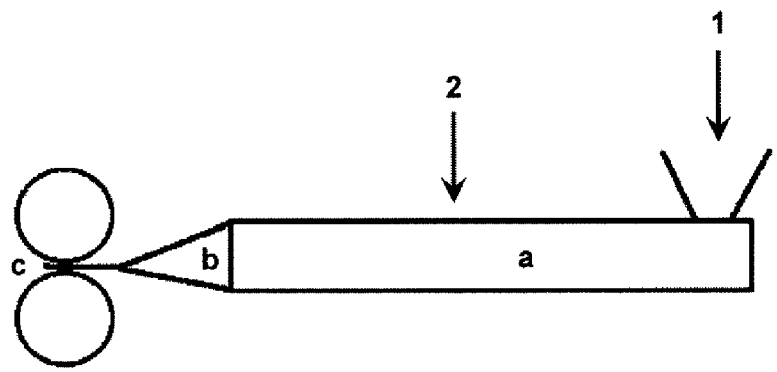

As shown in FIG. 1, the components for the base composition (1) are introduced into the intake region of the extruder line (a). The reactive components (promoter and/or crosslinker resin) can be added to the base composition at any desired point (2) in the extruder line (a) when the base composition is in homogeneous form, i.e. the rubber is broken down, and the temperatures of the base composition are lower than the temperature at which the crosslinking reaction commences. The reactive components are preferably added as late as possible, in order to minimize their residence time in the extruder line and so reduce to a minimum the dead volumes. However, the reactive components must be added early enough that all of the constituents of the composition are homogeneously commixed when they leave the extruder line via the die (b). Ideally the extruder line, following the addition of the reactive components, contains suitable mixing assemblies such as a planetary roller extruder.

The reactive components are preferably added in liquid form but may also be introduced as solids. After the mixing and homogenizing step, the base composition is cooled to the necessary temperatures by means of suitable cooling assemblies. In addition it is necessary to ensure that, following addition of the reactive components, the temperatures on the remaining path in the extruder line (a, b) remain below the crosslinking temperature.

One example of a suitable thermally reactive composition is made up as follows (amounts in % by weight):
45% natural rubber (cis-1,4-polyisoprene) (TSR 3L, Weber & Schaer, Hamburg)
17% resin acid, part-hydrogenated rosin (Staybelite Resin-E, Hercules BV)
19% Dercolyte S 115 resin, poly-beta-pinene resin with 0.1% BHT (Decrolyte S 115, supplier: Willers, Engel & Co., manufacturer: DRT/Dax France)
4% reactive alkyl-phenolic resin with a methylol content of 5-9% (HRJ 10518 H, Schenectady Europe SA)
19% zinc oxide active, highly disperse zinc oxide (Bayoxid Z aktiv, Lanxess Europe GmbH & Co.)

Alternatively, instead of the zinc oxide/resin acid promoter system, it is also possible to use zinc resinate (zinced rosin, around 11% zinc white or 9% zinc, Erkazit 250, Robert Kraemer GmbH & Co.).

The crosslinking is influenced not only by the temperature but also by the residence time of the thermally reactive adhesive in the extruder line following the addition of all of the reactive components, in other words in the section between feed point '2' and extruder line outlet 'b'. The residence time of the volume elements of the composition is dependent on the throughput and for this extruder line with the example composition is between 5 minutes (maximum throughput) and 10 minutes (minimum throughput). In order to keep the crosslinking of the adhesive low, the residence time ought to be as low as possible.

Figure 2:
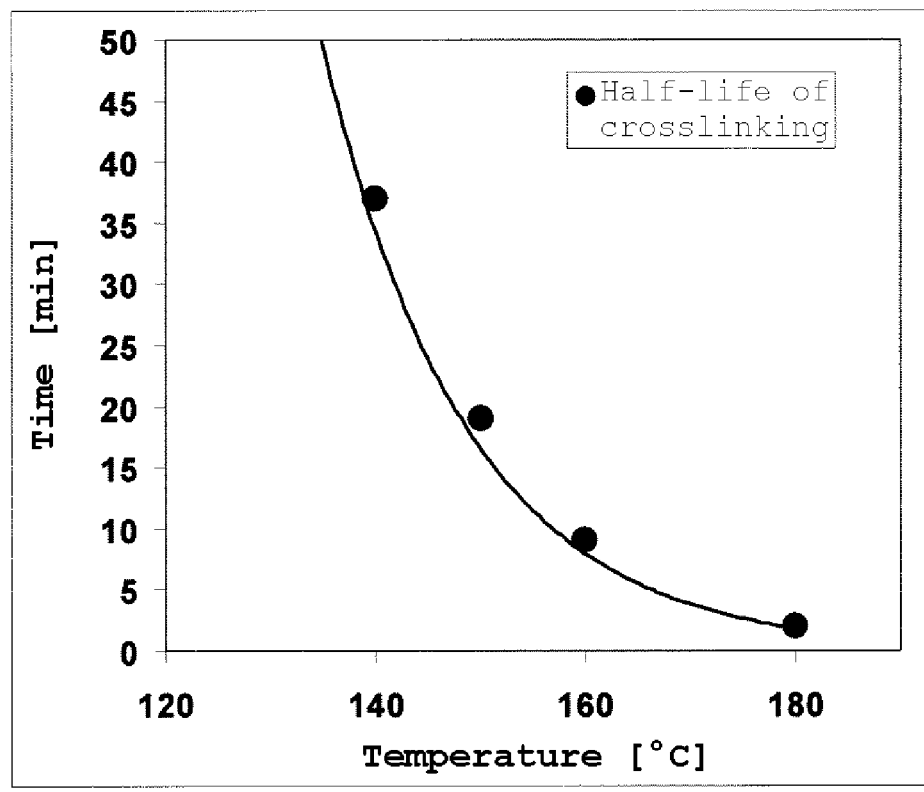
FIG. 2 shows in a diagram the connection between crosslinking, time and temperature for the example composition.

The connection between crosslinking, time and temperature for the example composition is shown by FIG. 2. Plotted in this figure is the half-life of crosslinking (abscissa) against the temperature (ordinate). The half-life can be derived from crosslinking curves of the kind shown by way of example in FIG. 3 for crosslinking at 180° C. (10 rad/s). The half-life describes the time from the start of measurement (t=0) up until the time at which half of the final viscosity figure (t>20 min) is reached. This figure is very well reproducible and in approximation is independent of the measurement frequency. The half-life describes the reactivity of crosslinking. It is dependent exponentially on the temperature (continuous line in FIG. 2).

For a given construction of the extruder line, it is not possible to influence the residence time greatly, and, since the relationship between half-life and temperature is an exponential one, the temperature of the composition between '2' and 'b' (FIG. 1) must be kept as low as possible. For the example composition, this means temperatures between 100° C. and 130° C. At temperatures <100° C., the viscosity of the adhesive becomes too great, and the adhesive can in that case not be applied in the subsequent application methods, and, furthermore, the pressure losses in the extruder line become too great. At temperatures >130° C., the composition undergoes crosslinking after just short standstill times, and this entails complicated cleaning. Ideally the process temperature for the example composition is 120° C.

Figure 3:
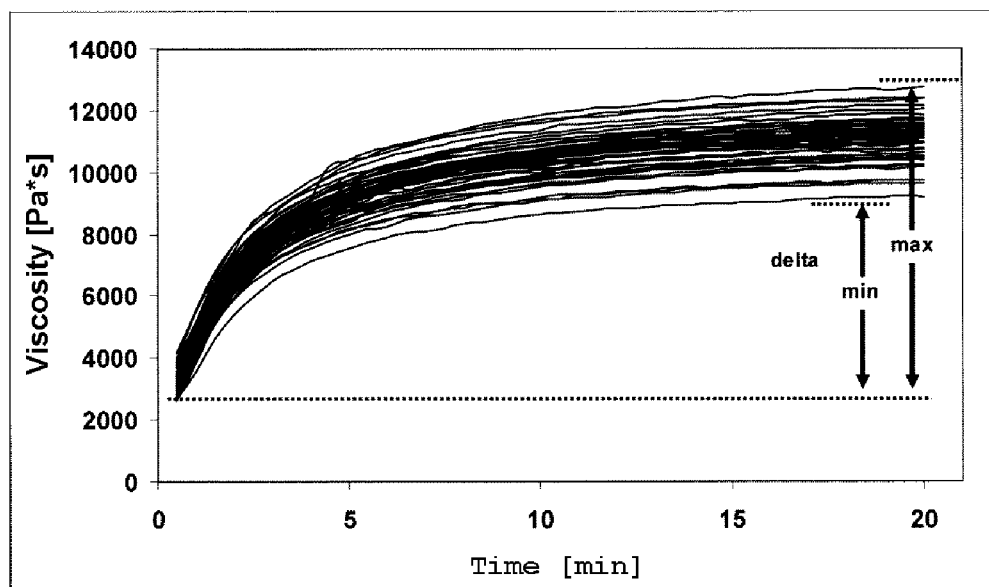
FIG. 3 shows crosslinking curves for the example composition.

FIG. 3 shows crosslinking curves for the example composition, recorded using the Rubber Process Analyzer (RPA 2000) at a crosslinking temperature of 180° C. and a frequency of 10 rad/s. The initial viscosity figures (t=0) vary between 3000 and 4000 Pas (10 rad/s and T=180° C.); the viscosity values of the crosslinked composition (t=20 min) vary between 9000 and 13 000 Pas (10 rad/s and T=180° C.). The figure for the crosslinking potential, which is critical for the thermal stability of the adhesive tape in temperature application, and which is defined here as the difference between final value (t>20 min) and initial value (t=0) of the viscosity, varies, for the example composition, between 5000 and 10 000 Pas (10 rad/s and T=180° C.). For sufficient temperature stability (i.e. residueless removal of the adhesive tape after 1 hour at a temperature load of 140° C.), the crosslinking potential must be >2000 Pas. In the case of smaller crosslinking potentials, residues are produced in the case of the example composition.

Figure 4:
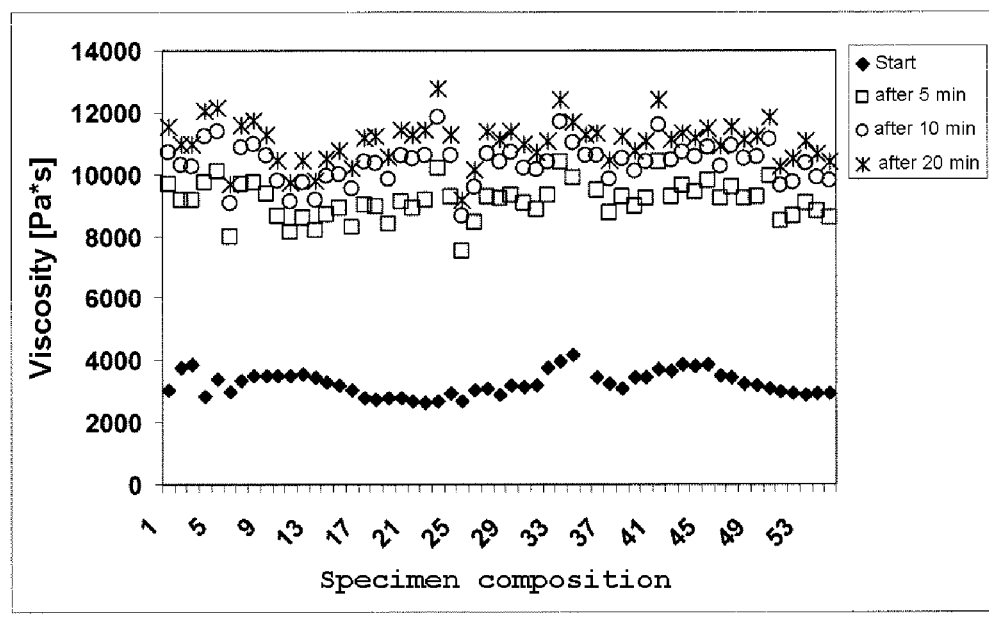
FIG. 4 shows viscosities of the individual specimen compositions at different times in the viscosity measurement.

FIG. 4 shows the viscosities of the individual specimen compositions, measured at 180° C. and a frequency of 10 rad/s, at the beginning of viscosity measurement (t=0), and after 5 minutes, 10 minutes and 20 minutes. According to that figure, the adhesive is very largely crosslinked at 180° C. after just 5 minutes. In other words, the viscosity value after 20 minutes is a good approximation of the steady-state figure for the maximum crosslinking (maximum crosslinking potential).

The invention claimed is:

1. A process for preparing a thermally reactive pressure-sensitive adhesive, comprising a non-thermoplastic rubber constituent of the pressure-sensitive adhesive, and a crosslinker system, the crosslinker system comprising a promoter component and a reactive phenolic resin, wherein the process comprises
   (a) mixing the rubber constituent and a crosslinker system component selected from the group consisting of a promoter and a reactive phenolic resin homogeneously in a mixing assembly, at a first processing temperature of the mixing assembly, to give a premix, a premix temperature being established in the premix, wherein the premix temperature is between about 140° C. and 200° C.;
   (b) cooling the premix from the premix temperature to a final composition temperature which is lower than the first premix temperature, wherein the final composition temperature is between about 110° C. and 130° C.; and
   (c) adding a crosslinker system component selected from the group consisting of a promoter and a reactive phenolic resin to the cooled premix, provided that if a promoter is added in step (a), then a reactive phenolic resin must be added in step (c) and that if a reactive phenolic resin is added in step (a) then a promoter must be added in step (c),
   wherein the crosslinker system component added in step (c) is added to the premix in a planetary roller extruder.

2. The process according to claim 1, wherein the crosslinker system component added in step (c) is added when the premix is being mixed in a mixing assembly.

3. The process according to claim 2, wherein the mixing of the premix with the crosslinker system component added in step (c) is carried out in the same mixing assembly as the mixing of the non-thermoplastic rubber constituent of the pressure-sensitive adhesive with the crosslinker system component added in step (a).

4. The process according claim 1 wherein the constituents of the adhesive are introduced without a solvent into the process.

5. The process according to claim 1 wherein the rubber constituent is a natural rubber.

6. The process according to claim 1 wherein the crosslinker system further comprises a second promoter component which with the promoter component forms a promoter system, the second promoter component being mixed either together with the crosslinker system component added in step (a), with the rubber constituent or being added together with the crosslinker system component added in step (c).

7. The process according to claim 1 wherein the promoter component is zinc.

8. A thermally reactive pressure-sensitive adhesive comprising a non-thermoplastic rubber constituent and a crosslinker system comprising a reactive phenolic resin component and a promoter component, the pressure adhesive prepared in the process according to claim 1.

* * * * *